(12) United States Patent
Seitz

(10) Patent No.: US 9,951,943 B2
(45) Date of Patent: Apr. 24, 2018

(54) PREVENTING TUBE FAILURE IN BOILERS

(71) Applicant: ALSTOM Technology Ltd, Baden (CH)

(72) Inventor: Michael Walter Seitz, Houston, TX (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 189 days.

(21) Appl. No.: 13/951,956

(22) Filed: Jul. 26, 2013

(65) Prior Publication Data

US 2013/0306002 A1    Nov. 21, 2013

Related U.S. Application Data

(60) Division of application No. 11/983,985, filed on Nov. 13, 2007, now Pat. No. 8,518,496, which is a
(Continued)

(51) Int. Cl.
*B05D 1/02* (2006.01)
*F22B 21/02* (2006.01)
(Continued)

(52) U.S. Cl.
CPC .......... *F22B 21/02* (2013.01); *B23K 35/0266* (2013.01); *B23K 35/22* (2013.01); *B23K 35/3033* (2013.01); *B23K 35/327* (2013.01); *B32B 15/013* (2013.01); *B32B 15/015* (2013.01); *C22C 19/05* (2013.01); *C22C 19/052* (2013.01); *C22C 19/053* (2013.01); *C22C 19/055* (2013.01); *C22C 19/058* (2013.01); *C22C 27/06* (2013.01); *C22C 30/00* (2013.01); *C23C 4/04* (2013.01); *C23C 4/06* (2013.01); *C23C 4/131* (2016.01); *F22B 37/107* (2013.01);
(Continued)

(58) Field of Classification Search
CPC .............. C23C 4/04; C23C 4/06; C23C 4/125
USPC ........ 427/449, 455, 456; 122/235.12, 235.14
See application file for complete search history.

(56) References Cited

U.S. PATENT DOCUMENTS 3,603,763 A    9/1971    Juzvenko et al.
3,855,447 A    12/1974    Kilp
(Continued)

FOREIGN PATENT DOCUMENTS

DE    39 28 092    2/1991
EP    0 522 438    1/1993
(Continued)

*Primary Examiner* — Dah-Wei D Yuan
*Assistant Examiner* — Nga Leung V Law
(74) *Attorney, Agent, or Firm* — GE Global Patent Operation; Stephen G. Midgley

(57) ABSTRACT

The erosion-prone sections of the tubes in a circulating fluidized bed boiler are provided with a locally thickened sidewall without forming discontinuities on the outer surface of the tubes. This can be accomplished, for example, by replacing the erosion prone portion of the tube with a section having a smaller inside diameter, but the same outside diameter, or by replacing the erosion prone portion of the tube with a section having a thicker sidewall, but the same inside diameter, and smoothing over the outside discontinuity with an alloy coating. A useful alloy coating is also disclosed which can be used for this and other applications.

11 Claims, 7 Drawing Sheets

Related U.S. Application Data continuation-in-part of application No. 11/810,210, filed on Jun. 5, 2007, now Pat. No. 7,645,493, which is a division of application No. 10/854,826, filed on May 27, 2004, now Pat. No. 7,256,369.

(60) Provisional application No. 60/476,875, filed on Jun. 6, 2003.

(51) Int. Cl.

| | | |
|---|---|---|
| *B23K 35/02* | (2006.01) | |
| *B23K 35/22* | (2006.01) | |
| *B23K 35/30* | (2006.01) | |
| *B23K 35/32* | (2006.01) | |
| *B32B 15/01* | (2006.01) | |
| *C22C 19/05* | (2006.01) | |
| *C22C 27/06* | (2006.01) | |
| *C22C 30/00* | (2006.01) | |
| *C23C 4/04* | (2006.01) | |
| *C23C 4/06* | (2016.01) | |
| *F22B 37/10* | (2006.01) | |
| *F23C 10/18* | (2006.01) | |
| *F23M 5/08* | (2006.01) | |
| *F28F 19/06* | (2006.01) | |
| *C23C 4/131* | (2016.01) | |

(52) U.S. Cl.
CPC ............ *F22B 37/108* (2013.01); *F23C 10/18* (2013.01); *F23M 5/08* (2013.01); *F28F 19/06* (2013.01); *F23M 2900/05001* (2013.01); *F23M 2900/05004* (2013.01)

(56) References Cited

U.S. PATENT DOCUMENTS

| | | | |
|---|---|---|---|
| 4,075,376 | A | 2/1978 | Jaeger |
| 4,578,114 | A | 3/1986 | Rangaswamy et al. |
| 4,741,974 | A * | 5/1988 | Longo et al. .................. 428/558 |
| 5,091,156 | A * | 2/1992 | Ijas ........................ F22B 31/003 |
| | | | 122/235.12 |
| 5,141,571 | A | 8/1992 | DuBois |
| 5,183,636 | A | 2/1993 | DuBois |
| 5,239,945 | A | 8/1993 | McCoy |
| 5,250,355 | A | 10/1993 | Newman et al. |
| 5,294,462 | A | 3/1994 | Kaiser et al. |
| 5,332,628 | A | 7/1994 | Drossman |
| 5,837,326 | A | 11/1998 | Dallaire et al. |
| 5,893,340 | A | 4/1999 | Belin et al. |
| 5,910,290 | A * | 6/1999 | Hyppanen ..................... 422/139 |
| 5,976,704 | A | 11/1999 | McCune |
| 6,044,805 | A | 4/2000 | Walker et al. |
| 6,156,443 | A | 12/2000 | Dallaire et al. |
| 6,258,416 | B1 | 7/2001 | Seitz |
| 6,428,630 | B1 | 8/2002 | Mor et al. |
| 6,491,000 | B1 | 12/2002 | Walker et al. |
| 6,495,268 | B1 * | 12/2002 | Harth, III ..................... 428/586 |
| 6,513,728 | B1 | 2/2003 | Hughes et al. |
| 6,603,090 | B1 | 8/2003 | Schreiber et al. |
| 7,256,369 | B2 | 8/2007 | Seitz |
| 2004/0001966 | A1 | 1/2004 | Subramanian et al. |

FOREIGN PATENT DOCUMENTS

| | | |
|---|---|---|
| GB | 699 646 | 11/1953 |
| GB | 1224 678 | 3/1971 |
| WO | 98/00574 | 1/1998 |
| WO | 01/08810 | 2/2001 |

\* cited by examiner

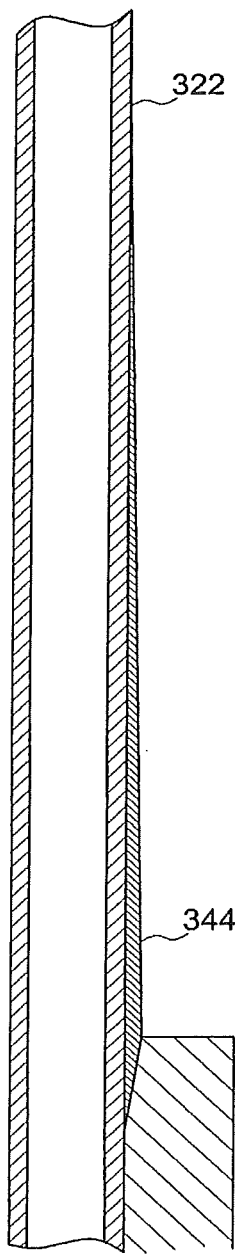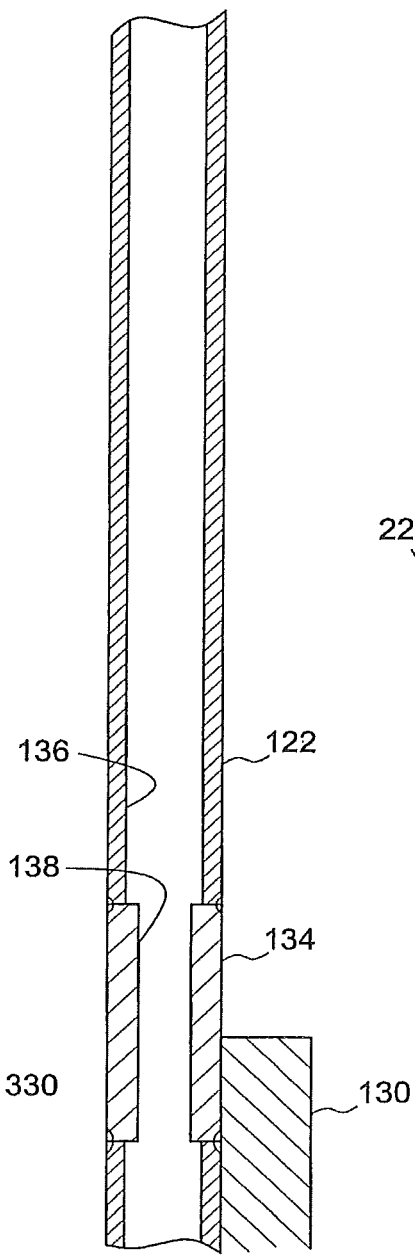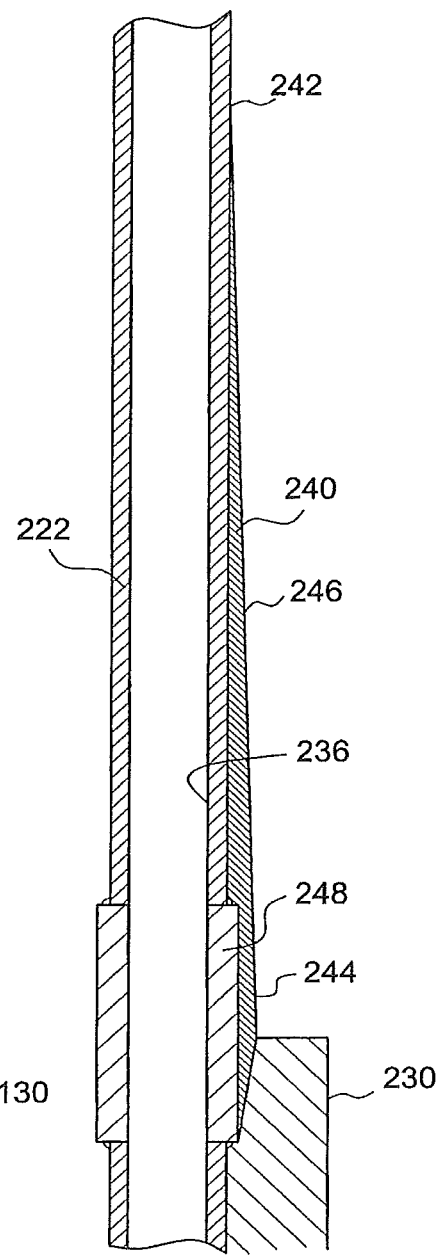
FIG. 11  FIG. 12  FIG. 13
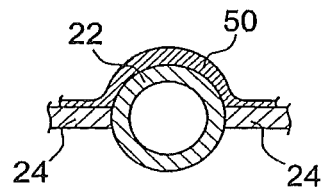
FIG. 14

PREVENTING TUBE FAILURE IN BOILERS

CROSS REFERENCES TO RELATED APPLICATIONS

This application is a divisional application of U.S. Non-provisional application Ser. No. 11/983,985, filed Nov. 13, 2007, which is a continuation-in-part of U.S. Non-provisional application Ser. No. 11/810,210 filed Jun. 5, 2007, now U.S. Pat. No. 7,645,493, which was a division of U.S. Non-provisional application Ser. No. 10/854,826 filed May 27, 2004, now U.S. Pat. No. 7,256,369 issued Aug. 14, 2007, which claimed benefit of US Provisional Application No. 60/476,875 filed Jun. 6, 2003, the disclosures of which are each hereby incorporated in their entirety.

TECHNICAL FIELD

In one aspect, the invention relates to preventing tube failure in boilers, especially circulating fluidized bed boilers, as these are especially susceptible to tube failure in areas of high erosion. In another aspect, the invention relates to a coating material that can be used on boiler tubes.

BACKGROUND

The invention relates to the wear/erosion seen on boiler tubes located above the refractory ledge (1-3" typically) of circulating Fluidized bed boilers (CFB's). The erosion is specifically seen in certain CFB designs, where a "step" or discontinuity is created at the top of the refractory ledge where the boiler tubes are exposed. The severe wear occurs on the boiler tubes (steel) that extend above the refractory (Le., above the step), the wear pattern resembling at least one, or generally a pair, of deep "thumb prints" on each boiler tube. These wear marks just above the refractory usually lead to boiler tube leaks, sometimes in periods as short as a few weeks in severe cases (typically these units need to run for one year between outages). This problem is typically addressed by design changes of the refractory/tube interface, or erosion resistant thermal spray coatings in the wear areas. For existing boilers, thermal spray is the most economic method (and typical) of addressing the erosion problem. While coatings offer sufficient protection to prevent tube leaks between outages. they do not generally perform well enough to prevent tube gouging, which requires welding and grinding repair during each outage.

Tube shielding, which may be in the form of weld buildup, wear resistant plate (tube shields), or refractory tiles positioned just above the refractory ledge cannot easily be deployed in an effort to mitigate erosion of the tubes, since the "step" or discontinuity at the top edge of the shielding may become the source of failure.

A technique to prevent tube failure near discontinuities in the boiler is much needed.

SUMMARY

According to certain aspects of the invention, the erosion-prone sections of the tubes are provided with a locally thickened sidewall, with care being taken to avoid discontinuities on the outer surface of the tubes. This can be accomplished, for example, by replacing the erosion prone portion of the tube with a tube section having a smaller inside diameter, but the same outside diameter, thereby substantially increasing the side wall thickness of the tube in the erosion prone area. or by replacing the erosion prone portion of the tube with a section having a substantially thicker sidewall, but the same inside diameter, and smoothing over the outside discontinuity with an alloy coating which gradually tapers down to the nominal outside diameter of the tube, or by substantially building up the sidewall thickness of the tube in the erosion prone section by applying an alloy coating which gradually and smoothly tapers to the nominal outside diameter of the tube. The side wall thickness increase provides material, forming a characteristic pattern. This pattern progressively alters the localized erosion mechanism which in turn mitigates further erosion and slows significant on-going tube damage and possible premature failure.

Certain embodiments of the invention comprise an improvement to a vertically positioned water tube wall, such as is found in a Circulating fluidized bed boiler. The water wall has an upper end and a lower end and is formed from a plurality of vertically positioned parallel metal tubes interconnected by a metal webbing. The water tube wall has a "fire" side in front of the webbing and a "cold" side behind the webbing. A vertically positioned refractory wall is positioned against the bottom side of the fire side of the water tube wall, i.e., the wall covers a lower end of the tubes. During boiler operation, it has been found that significant gouging (erosive wear) of the exposed boiler tubes occur just above the refractory wall. In a first embodiment of the invention, the improvement is to provide the water wall with tubes having a section of increased sidewall thickness just above the upper end of the refractory wall. The section of increased sidewall thickness has an increased thickness of at least 0.100 inches and smoothly and gradually tapers to a section of the tubes having a uniform sidewall thickness. In a second embodiment of the invention, the improvement is to provide tubes having a section of increased sidewall thickness and lesser inside diameter just above the upper end of the refractory wall, the outside diameter of the tubes being constant. In this embodiment, also, the section of increased sidewall thickness has an increased thickness of at least 0.100 inches.

The first noted embodiment of the invention can be carried out by providing the tubes with an increased thickness section having an increased sidewall thickness of at least 0.100 inches at locations in the fluidized bed boiler where the tubes are susceptible to gouging, and further providing the tubes with a tapered section connected to the increased thickness section which smoothly and gradually tapers away from the locations where the tubes are susceptible to gouging to nil over a distance of at least 12 inches.

The second noted embodiment of the invention can be carried out by providing the tubes with an increased thickness section having an increased sidewall thickness of at least 0.100 inches at locations in the fluidized bed boiler where the tubes are susceptible to gouging by welding a tubing section having a thicker sidewall into each tube. The welded section has an inside diameter which is smaller than the inside diameter of the balance of the tube and an outside diameter which is the same as the balance of the tube.

An inventive tube is provided according to another embodiment of the invention. The tube is defined by a tubular sidewall and has a first end, a second end, a length as measured between the first end and the second end, and a longitudinal axis. The tube has a non-uniform wall thickness along a portion of its length. In other words, the wall thickness is not constant over the length of the tube. The sidewall has a thickened wall thickness area. The thickened area is axially elongated and gradually tapers axially to an area of the tube having a uniform sidewall thickness.

Certain embodiments of the invention are carried out by applying an alloy coating to build up the sidewall thickness of the tube and/or to provide a tapering section which gradually and smoothly tapers to the nominal outside diameter of the tube. The alloy coating is preferably applied only to the fire side of the tube. Any alloy coating having adequate temperature and erosion resistance which can be built up to the required thickness can be used for this purpose. However, according to another embodiment of the invention, a highly desirable coating, applied using an arc based spray method, which can be applied to required thicknesses and resists throughcracking and spalling, comprises a non-homogenous coating comprising discrete discernible layers of slightly varying alloy compositions, with typically more than 10 such layers being discernible in the thickest part of the coating cross section. The coating comprises, in bulk on a weight basis, 39 to 66% Nickel, 29% to 51% Cr, and 2 to 8%8. The discrete layers vary in Rockwell hardness (and provide the coating with layers having differing hardnesses from each other) over the range of from 30 RC to 72 RC.

The coating is preferably formed, according to another embodiment of the invention, by providing a cored wire and applying it to the substrate by an arc based spray technique. The cored wire contains all the alloy constituents that comprise the final coating deposit. The cored wire contains a chrome constituent and a boron constituent in the core of the wire and further comprises a nickel or nickel alloy outer sheath. The wire is arc melted by thermal spray technique to form a molten alloy coating composition. The molten alloy coating composition is applied onto a substrate and permitted to solidify to form the alloy coating deposit. The alloy coating deposit comprises at least 10 discrete discernible layers of different alloy compositions, as previously described. The thickness of the layers can be changed by adjusting spray parameters, e.g., the air pressure of the arc spray equipment.

BRIEF DESCRIPTION OF THE DRAWINGS

FIG. 11 is a cross sectional view of a boiler tube according to another embodiment of the invention.

FIG. 12 is a cross sectional view of a boiler tube according to another embodiment of the invention.

FIG. 13 is a cross sectional view of a boiler tube according to another embodiment of the invention.

FIG. 14 is a cross sectional view of the tube shown in FIG. 6 along lines 14-14.

DETAILED DESCRIPTION

Figure 1:
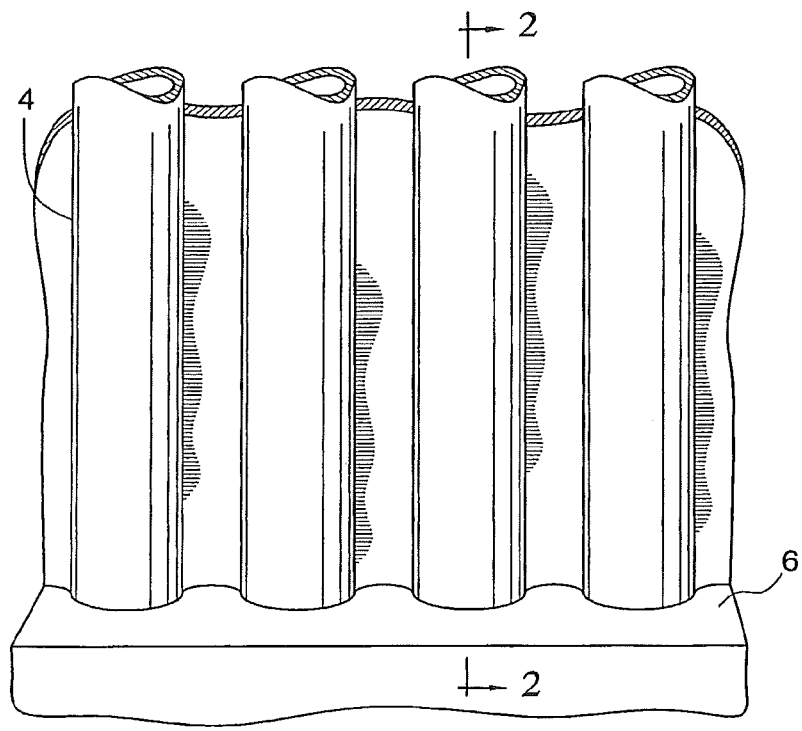
FIG. 1 (prior art) is a pictorial view of a lower section of a water wall in a circulating fluidized bed boiler in new condition.
Figure 2:
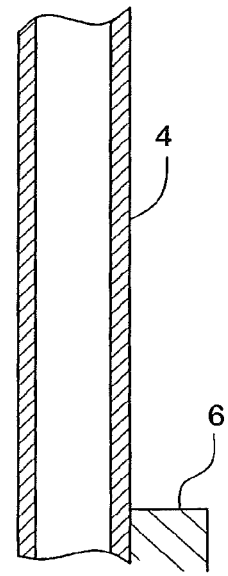
FIG. 2 (prior art) is a cross sectional view along lines 2-2 of FIG. 1 of one of the tubes in the boiler.
Figure 3:
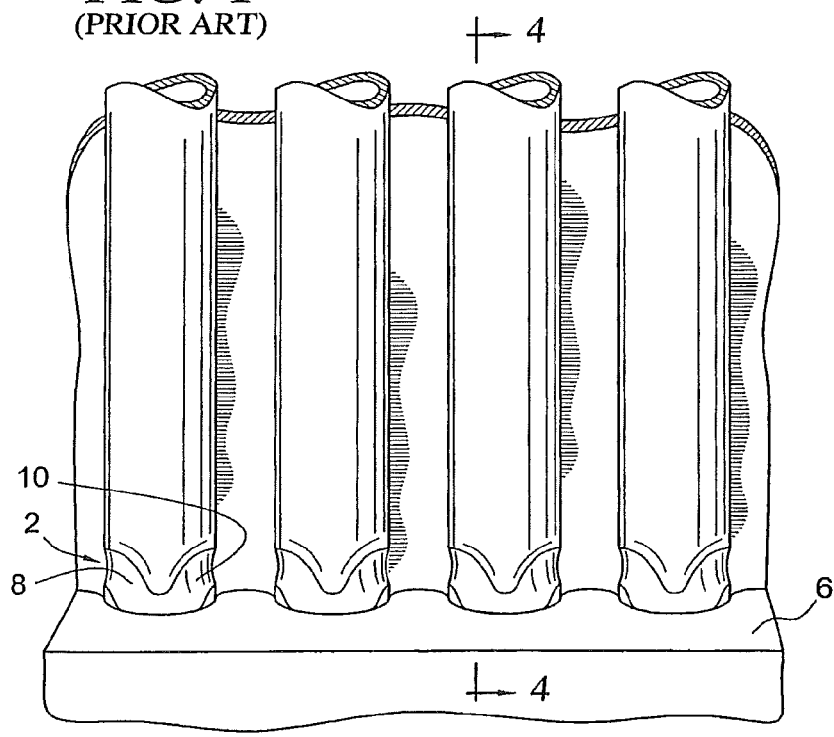
FIG. 3 (prior art) is a pictorial view of the lower section of the water wall as in FIG. 1 after the tubes have been damaged by erosion.
Figure 4:
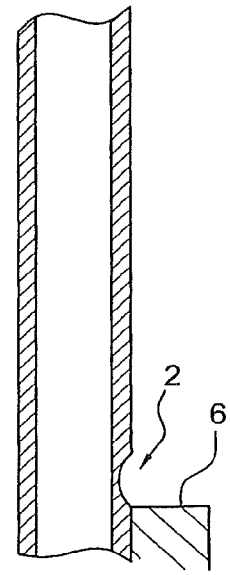
FIG. 4 (prior art) is a cross sectional view along lines 4-4 of FIG. 3 of one of the tubes in the boiler.

With reference to FIGS. 1 through 4, which are prior art, the invention relates to the wear/erosion 2 seen on boiler tubes 4 located above the refractory ledge 6 (1-3" typically) of Circulating fluidized bed boilers (CFB's). FIGS. 1 and 2 show the tube wall as installed. FIGS. 3 and 4 show the tubes after the occurrence of erosion. The erosion is specifically seen in certain CFB designs, where a "step" is created at the top of the refractory ledge where the boiler tubes are exposed~ The illustrated step or shelf is one of the configurations typically used, but several other variations are used which include changing the inclination angle of the termination ledge. The severe wear occurs on the boiler tubes (steel) that extend above the refractory (i.e., above the step), the wear pattern generally resembling at least one, generally a pair of, deep "thumb prints" 8, 10 on each boiler tube. Design variation in the angle of the refractory ledge, and the thickness of the refractory wall, can influence the actual vertical location of the "thumb print", the location of the thumb prints typically being 0 to 5 inches above the refractory. These wear marks just above the refractory usually lead to boiler tube leaks, sometimes in periods as short as a few weeks in severe cases (typically these units need to run for one year between outages). In the prior art. as shown in FIGS. 1-4, the tubes had a uniform sidewall thickness over their length.

According to certain aspects of the invention, and with reference to FIGS. 5-10, a vertically positioned water tube wall 20 is provided having an upper end and a lower end. The water wall is formed from a plurality of vertically positioned parallel metal tubes 22 interconnected by a metal webbing 24. The webbing can be formed from steel bars connected diametrically to the tubes. The wafer tube wall has a fire side 26 in front of the webbing and a cold side 28 behind the webbing. A vertically positioned refractory wall 30 is positioned against the lower end of the water tube wall. The wall as illustrated has a generally flat upper end 32 normally adjacent to the lower end of the water tube wall. However, the upper end of the wall could be positively or negatively inclined at an angle if desired, and need not be flat. The tubes extend into the refractory wall and the wall covers a front side of the lower end of the tubes, protecting the front side of the lower ends of the tubes against erosion and excessive heat.

In a first embodiment of the invention, the improvement is to provide the water wall with tubes 22 having a section 34 of increased sidewall thickness just above the upper end of the refractory wall. The section of increased sidewall thickness has an increased thickness of at least 0.100 inches and smoothly and gradually tapers to a section of the tubes having a uniform sidewall thickness. By "just above" the upper end of the refractory wall, in all embodiments, is meant from 0 to about 5 inches.

Alternatively, the improvement is to provide tubes 124 having a section 134 of increased sidewall thickness and lesser inside diameter just above the upper end of the refractory wall 130, the outside diameter of the tubes being constant. See FIG. 12. In this embodiment, also, the section of increased sidewall thickness has an increased thickness of at least 0.100 inches.

In the alternate embodiment, (FIG. 12) the tubes preferably have an inner surface defining a first generally cylindrical portion 136 and a section defined by a second generally cylindrical portion 138 having a smaller inside diameter than the first generally cylindrical portion. The section defined by the second generally cylindrical portion is positioned so that the tube has a thickened sidewall beginning at a location from below the upper end of the refractory wall. The thickened section preferably extends above the refractory wall for a length in the range of from 3 to 30 inches.

In one way of carrying out the first noted embodiment of the invention, (see FIG. 13) a section 240 of the outside surface of the tube 222 tapers away from the area of maximum sidewall thickness in a direction away from the refractory wall 230. The tubes have a non-uniform sidewall thickness over their length and have an inside diameter which is uniform and an outer surface defining a first generally cylindrical portion 242, a second generally cylindrical portion 244 positioned at a location just above the upper end of the refractory wall having a larger outside diameter than the first generally cylindrical portion, and a tapering portion 246 extending between the first generally cylindrical portion and the second generally cylindrical portion.

The second generally cylindrical portion can be provided in the form of a tubing section or collar 248 which is welded to the first generally cylindrical portion. The tapering portion preferably comprises a metal alloy cladding applied by spray technique which has a length of at least 12 inches. The cladding can extend over the second generally cylindrical portion, as illustrated in FIG. 13. An additional way is to pad weld a 180 degree tubular saddle onto the tube, followed by spray overlay.

Figures 5, 6:
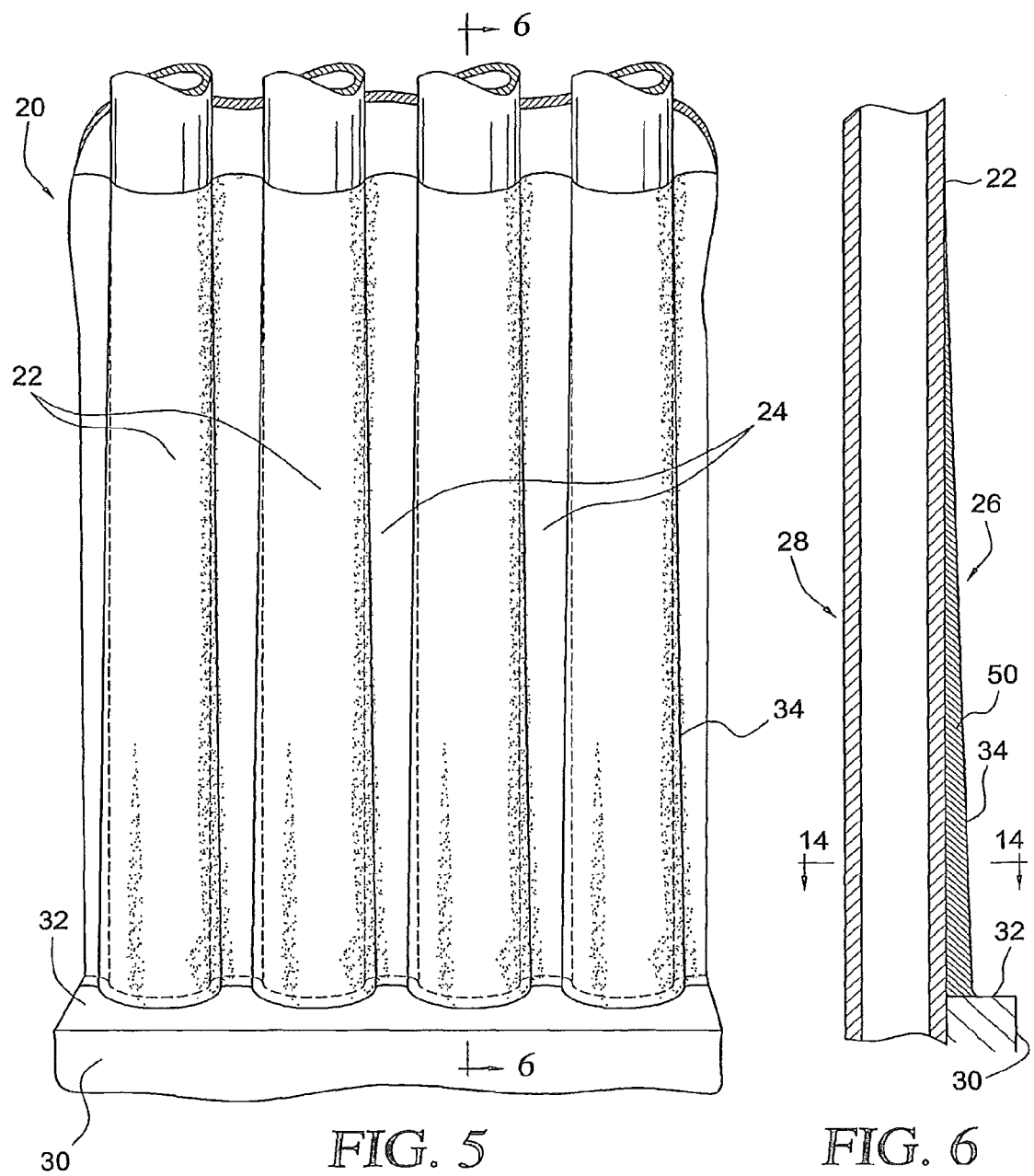
FIG. 5 is a pictorial view of a lower section of a water wall in a circulating fluidized bed boiler in new condition, according to an embodiment of the invention.
FIG. 6 is a cross sectional view along lines 6-6 of FIG. 5 of one of the tubes in the boiler.
Figures 7, 8:
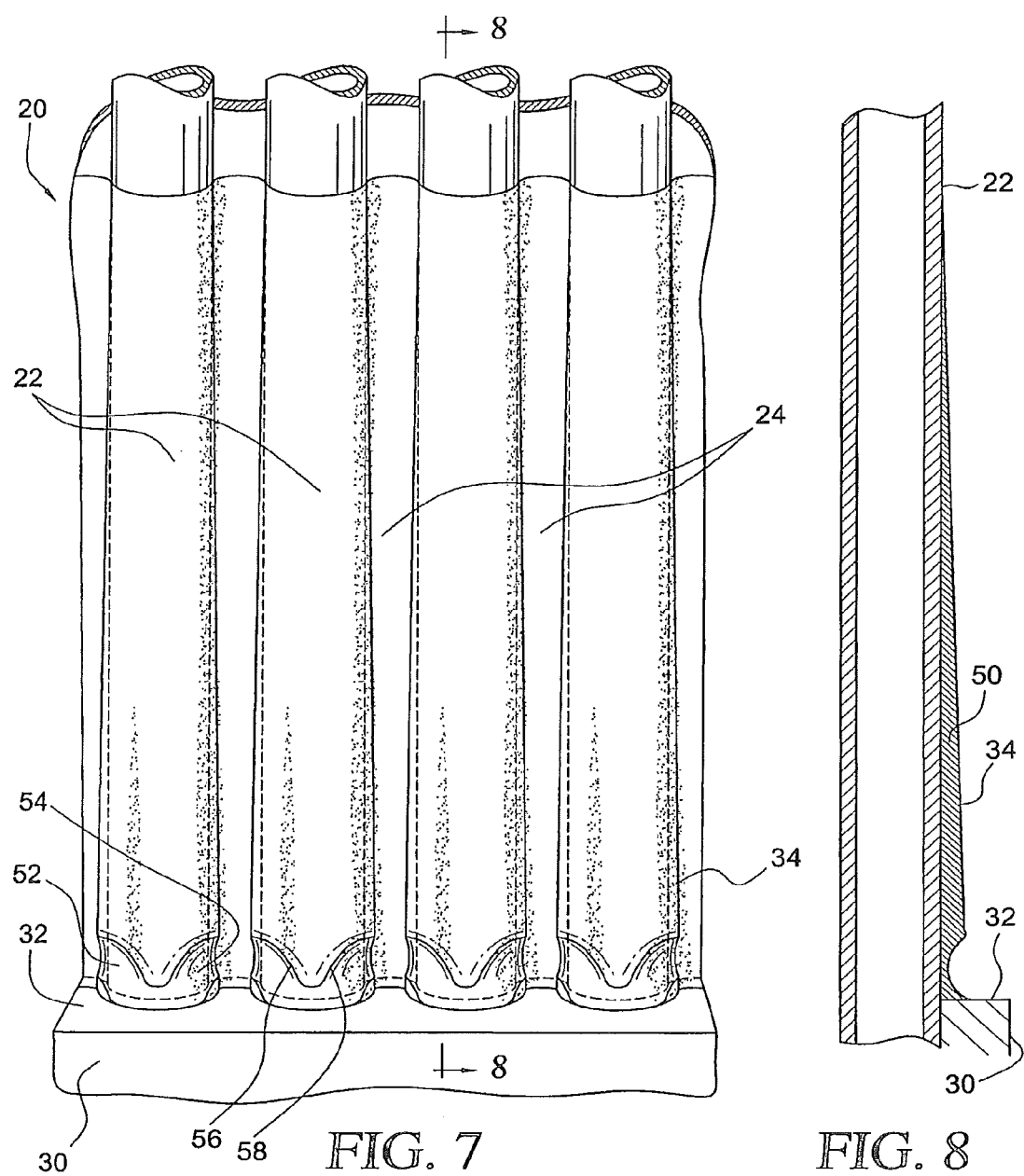
FIG. 7 is a pictorial view of the lower section of the water wall as in FIG. 5 after the tube coating has been desirably modified by erosion.
FIG. 8 is a cross sectional view along lines 8-8 of FIG. 7 of one of the tubes in the boiler.
Figures 9, 10:
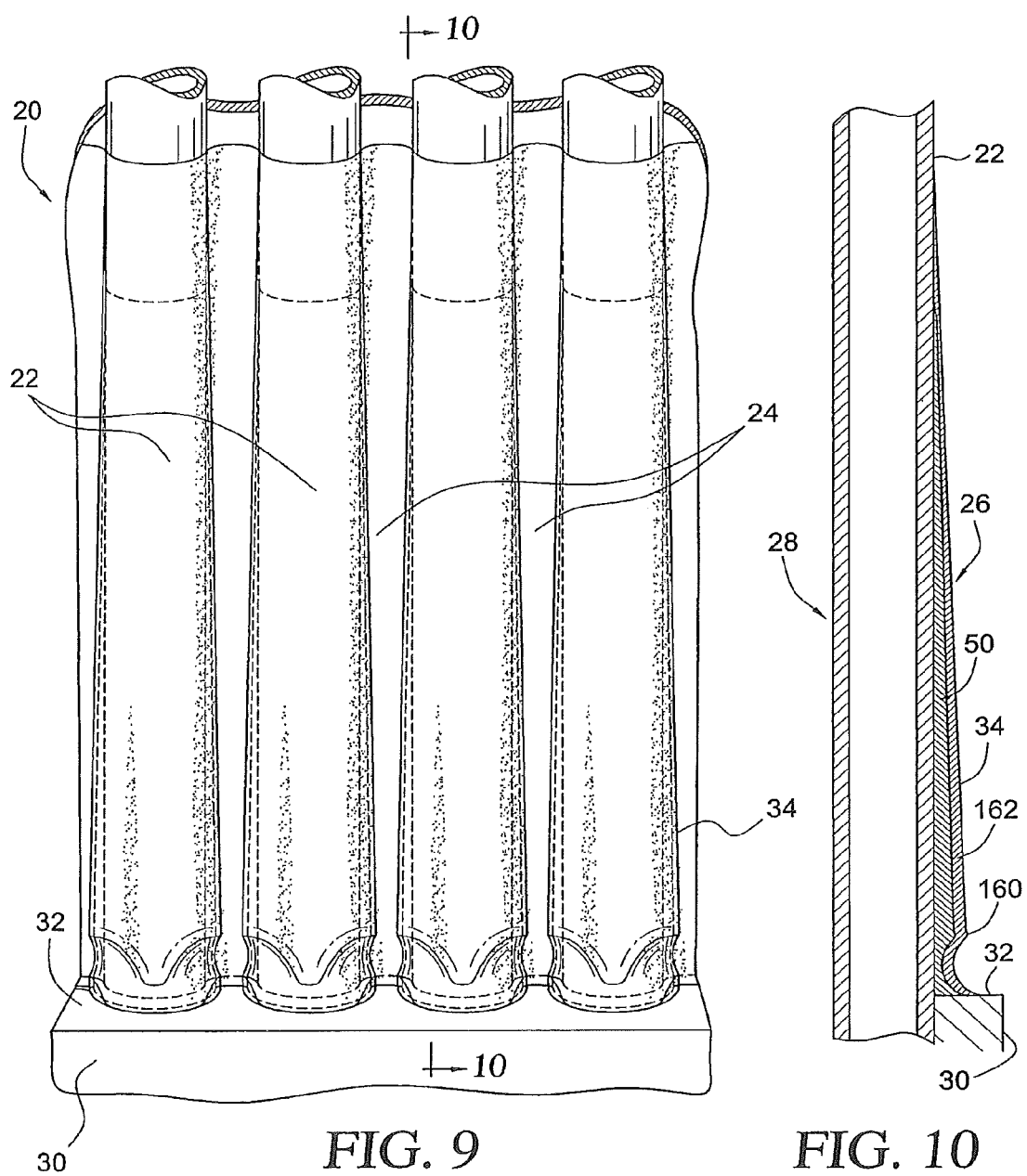
FIG. 9 is a pictorial view of the lower section of the water wall as in FIG. 7 after the damaged tube coating has been repaired according to certain maintenance aspects of the invention.
FIG. 10 is a cross sectional view along lines 10-10 of FIG. 9 of one of the tubes in the boiler.

In another way of carrying out the first noted embodiment, and as illustrated in FIGS. 5-10, the section of increased tube wall thickness can be provided totally in the form of cladding. In such a case, the section of increased sidewall thickness comprises a first layer (the wall of tube 22) and a second layer 50. The first layer is tubular and has a uniform sidewall thickness. The second layer comprises a coating positioned radially outwardly from the first layer and can be generally saddle-shaped. The second layer has a maximum thickness portion and a tapering thickness portion. The maximum thickness portion is positioned at a location just above the upper end of the refractory wall, generally in the range of 0 to 5 inches above the wall. The exact location depends on where the greatest erosion would be expected to occur, and depends on the width and angle of the ledge, for example. The maximum thickness portion has a thickness, as measured radially from the longitudinal axis of the tube, which is at least 0.060 inches. The length of the portion having a thickness of at least 0.060 inches, as measured parallel to the axis of the tube, is at least 2 inches. The tapering thickness portion preferably transitions smoothly to nil thickness over a length, as measured longitudinally, which is at least 12 inches. The second layer generally further gradually tapers circumferentially and can be thinnest facing directly away from the wall. In practice, the section of increased thickness as shown in FIGS. 6, 8 and 10 can extend to below the surface of the refractory, as shown in FIG. 11, for example.

The second layer preferably comprises a coating applied by spray technique. The coating is preferably present on the fire side half of the tube wall, but not the cold side half, and bridges the web/membrane. See FIG. 14.

The second layer in a further preferred embodiment forms a pad which provides a sacrificial area of maximum thickness as measured radially from the longitudinal axis of the tube. In the area of greatest thickness, the second layer is at least 0.060 inches thick and the length of the area having a thickness of at least 0.060 inches as measured parallel to the axis of the tube is at least 2 inches. The saddle extends circumferentially around the tubular sidewall and generally spans an angle which is approximately 180 degrees and extends over the web. The sides of the saddle on the tubes are generally of greatest thickness and are bounded by the webbing, which may be similarly thickly cladded during the application step. The cladding is generally thicker on the webbing and on the quarter round portions of the tube in front of the webbing than it is on the portion of the tube facing directly away from the webbing, (crown of the tube), as erosion is generally more severe on the quarter-sides of the tubes than on the crown of the tube.

After erosion has occurred, and during a maintenance opportunity, an additional layer 162 of cladding can be applied to refurbish or freshen the tubes. See FIG. 10. In such case, the tube near the refractory ledge will comprise 3 or more layers. The thick buildup of cladding disproportionately against the webbing in the troughs at the lower end of the wall through application and reapplication of the cladding during repairs results in a flattening of the undulations in the wall is a desirable effect that is allowed to occur.

The saddle preferably comprises a nickel/chrome/boron cladding. The saddle provides the tube with an outside surface which is non-cylindrical. During use, erosion processes form one or more thumbprint-shaped depressions in each tube, for example, depressions 52, 54 resembling eye sockets in the thickened area. The generally thumbprint shaped depressions are longitudinally elongated along a generally spiral path just above the discontinuity such as the refractory wall. At least one, generally a pair of generally circumferentially extending eyebrow-shaped ridges 56, 58 extend from a front central location on the tube, these being positioned over the thumbprint-shaped depression(s). These depressions and eyebrows act to reduce the erosive process, and their formation is a requirement for the future reduction in wear. Therefore, to immediately establish a lower wear condition, this geometry can also be formed during the fabrication process, or maintained when the tubes are freshened. See FIG. 10, eyebrow 160.

The first noted embodiment of the invention can be carried out by providing the tubes with an increased thickness section having an increased sidewall thickness of at least 0.100 inches at locations in the fluidized bed boiler where the tubes are susceptible to gouging, and further providing the tubes with a tapered section connected to the increased thickness section which smoothly and gradually tapers away from the locations where the tubes are susceptible to gouging to nil over a distance of at least 12 inches. Preferably, the tapered section is between 12 inches and 48 inches long. The increased thickness section preferably provides the tubes with a greatest sidewall thickness in the locations where the tubes are susceptible to gouging.

For application to a fluidized bed boiler, a tube wall comprising a vertically positioned plurality of parallel tubes is provided in the boiler. Each tube of the plurality has a section of greater sidewall thickness compared to a different section of the tube. The section of greater sidewall thickness has an increased sidewall thickness of at least 0.100 inches, as compared to the balance of the tube. The tube wall has an upper end portion and a lower end portion. At least the front side of the lower end portion of the tube wall is covered by a refractory wall. The refractory wall has an upper end defining the refractory ledge and a lower end. The upper end of the refractory wall is positioned adjacent to the lower end sections of the tubes of greater sidewall thickness, so that a section of each tube above the upper end of the refractory wall has an increased sidewall thickness of at least 0.100 inches and extends up sufficiently beyond the areas subject to severe gouging (thumb prints). The tapered section of each tube converges toward the axis of each tube in an upward direction, away from the refractory wall.

In one embodiment of the invention, (See FIGS. 11-13) the upper end of the refractory wall 130, 230, 330 is positioned on the tube sections 144, 244, 244 having the increased sidewall thickness, and the tube sections of increased sidewall thickness extend for a distance of at least 2 inches above the upper end of the refractory wall and for a distance below the upper end of the refractory wall.

In the embodiment of the invention wherein the greater thickness is provided in the form of a saddle shaped coating with at least an upwardly tapering end section applied by spray technique, the saddle shaped coating generally has a maximum thickness in the range of 0.060 to 0.200 inches. The coating is preferably thick and erosion resistant and can be provided in a pattern that resembles eyebrows directly above the areas of the tubes that are susceptible to gouging. In such case, the coating will have its maximum thickness in the areas resembling the eyebrows.

The coating can be provided by applying a thick erosion resistant coating to a fire side of the tubes which extends from a location above the top of the refractory ledge into which the tubes extend to above the locations where the tubes are susceptible to gouging. As previously described, subsequent operation of the boiler forms gouges in the provided thick erosion resistant coating that resemble thumbprints near the top of the refractory ledge and provides a pattern in the erosion resistant coating closely above the gouges that resembles eyebrows. The coating provides extreme resistance to further erosion once the gouges have reached a depth of greater than about 0.080 inches. The coating is preferably applied to a maximum thickness in the range of 0.080 to 0.200 inches near the top of the refractory ledge and is tapered above the maximum thickness to a nil thickness over a distance of at least 12 inches. The maximum thickness is preferably on a fire side the tube, directly facing an erosive environment in the fluidized bed boiler.

Usually, the boiler tubes are formed from steel. A preferred coating can be applied to such tubes from a wire having a metallic outer sheath and a powdered inner core. The inner core comprises at least about 28% by weight of boron and chrome in an amount between about 67% and about 185% by weight of the amount of the boron. The wire is melted using an electric arc heat source to form a melt. The melt is atomized and sprayed onto the tubes by compressed gas. The composite wire is selected to form a coating on the substrate comprising the metal of the sheath, chrome, and boron. The coating is then permitted to solidify. In a preferred embodiment, the metal of the sheath comprises nickel and at least one of the compound of boron and the compound of chrome comprises a carbide. The resultant coating comprises a nickel/chrome/boron cladding.

The tube section of greater thickness can be provided in the form of a tubing section having a thicker sidewall welded into each tube and having an inside diameter which is smaller than the inside diameter of the balance of the tube and an outside diameter which is the same as the balance of the tube, to provide the tubes with an increased thickness section having an increased sidewall thickness of at least 0.100 inches at locations in the fluidized bed boiler where the tubes are susceptible to gouging.

Alternatively, the section of greater thickness can comprise a collar or tubing section welded onto each tube which has an inside diameter which is the same as the balance of the tube and an outside diameter which is larger than the balance of the tube. In such case, the method further comprising providing the tube with an upwardly and inwardly tapering outer surface at least 12 inches in length at the upper end of the section of greater thickness to mitigate the formation of any discontinuity created by the collar addition. The tube section may be further coated to provide general wear protection.

An inventive tube is provided according to another embodiment of the invention. The tube is defined by a tubular sidewall and has a first end, a second end, a length as measured between the first end and the second end, a longitudinal axis, and a circumference as measured in a plane normal to the longitudinal axis. The tube has a non-uniform wall thickness along a portion of its length. The sidewall has a thickened wall thickness area in the portion of the tube having the non-uniform wall thickness. The thickened area is axially elongated and gradually tapers axially to an area of the tube having a uniform sidewall thickness.

The tube preferably has a longitudinally elongated tapering section which tapers toward the longitudinal axis of the tube at a maximum average angle in the range of 0.05 to 1.5 degrees over the length of the tapering section, preferably in the range of 0.1 to 1 degrees over the length of the tapering section. The tapering area is preferably only on one side of the tube.

In one embodiment, the tube has a longitudinally elongated section of substantially uniform maximum thickness and a smooth transition between the elongated section of substantially uniform maximum thickness and the longitudinally elongated tapering section.

In another embodiment, the tubular sidewall comprises a first layer and a second layer. The first layer is tubular and has a uniform sidewall thickness. The second layer is positioned radially outwardly from the first layer and is generally saddleshaped. The tube has an inside diameter which is uniform and an outside surface which is non-cylindrical.

The second layer can be described in a preferred embodiment as having an area of maximum thickness as measured radially from the longitudinal axis of the tube. The area of maximum thickness of the second layer is at least 0.060 inches thick. The area of increased thickness of at least 0.060 inches has a length as measured parallel to the axis of the tube which is at least 2 inches. The saddle preferably extends circumferentially around the tubular sidewall and spans an angle which is approximately 180 degrees.

In one embodiment, the generally saddle-shaped second layer defines at least one, generally a pair of, thumbprint-shaped depression(s) resembling thumbprints or eye sockets. The sockets are formed either during initial fabrication or during the process of using the tubes. The sockets are longitudinally elongated along a generally spiral path. In another embodiment, the generally saddle-shaped second layer defines at least one, generally a pair of, generally circumferentially extending eyebrow-shaped ridge(s) which, when present as a pair, extend in opposite directions from each other from a centrally location position on the fire side of the tube.

As noted above, certain embodiments of the invention are carried out by applying an alloy coating to increase the sidewall thickness of the tube and/or to provide a tapering section which gradually and smoothly tapers to the nominal outside diameter of the tube. Any alloy coating having adequate temperature and erosion resistance which can be built up to the required thickness can be used for this purpose. However, according to another embodiment of the invention, a highly desirable coating, which can be applied to required thicknesses and resists throughcracking and spalling, comprises a nonhomogeneous coating comprising discrete discernable layers of slightly segregated incomplete alloy compositions. The coating comprises, on bulk on a weight basis, 39 to 66% Nickel, 29% to 51% Cr, and 2 to 8%8. The discrete layers vary in hardness and are in the range of 30 RC to 72 RC, the NiCr layers being in the lower end of the range, the boride containing layers being in the upper end of the range. The coating is formed, according to another embodiment of the invention, by providing a cored wire and applying it to the substrate by an arc based spray technique. The cored wire contains all the alloy constituents that comprise the final coating deposit. The cored wire contains a chrome constituent and a boron constituent in the core of the wire and further comprises a nickel or nickel alloy outer sheath. The wire is arc melted by thermal spray technique to form a molten alloy coating composition. The molten alloy coating composition is applied onto a substrate and permitted to solidify to form the alloy coating deposit. The alloy coating deposit comprises discrete discernible layers of segregated alloy compositions, arid is as previously described.

In the coating, a portion of the Ni and a portion of the Cr preferably exist as hard borides. The coating composition can further comprise, in bulk on a weight basis, at least one additional constituent selected from the group consisting of up to 6% Si, up to 10% Mo, up to 6% Nb, up to 5% Al, up to 4% Ti, up to 9% Fe, up to 10% W, and up to 4% C. If any such additional constituent is present, it will generally be in the range of 0.5 to 6% Si, 0.5 to 10% Mo, 0.5 to 6% Nb, 0.5 to 5% Al, 0.5 to 4% Ti, 0.5 to 9% Fe, 0.5 to 10% W, and 0.5% to 4% C.

The coating composition is corrosion, erosion and abrasion resistant. It resists the formation of coating throughcracks and possible spalling by arresting microcracking at the layers having a RC in the lower end of the stated range.

Figure 15:
FIG. 15 is a photomicrograph of a thick coating according to certain aspects of the invention after it has been stressed, showing microcracks but no through-cracks.

FIG. 15 is an electron micrograph of a cross-section of the coating according to embodiments of the invention. The brightness of the image tends to increase with atomic number. Thus, layers averaging a lower atomic number appear darker in the image. The image thus shows contrast between areas in the coating with differing chemical composition. Layering is apparent, appearing eyebrow-shaped in the cross sectional view over a range of gray scales, indicating that the coating comprises the desired varying layered chemical composition in the coating.

Figure 16:
FIG. 16 is a photomicrograph of a coating as shown in parent Nonprovisional application Ser. No. 11/810,210.

FIG. 16 is a micrograph from the parent application of a coating cross-section formed by spraying a substrate with an alloy 625/boron carbide-chrome carbide composite wire. This photograph was taken using a different technique which does not emphasize compositional differences as much, and therefore the coating in FIG. 16 appears to show much greater homogeneity than the coating in FIG. 15. However, while not made as apparent in the parent application photograph, the coating produced using the alloy 625/boron carbide-chrome carbide composite wire does have the same layered properties that are desired for this application when sprayed through an arc based thermal spray system.

Additional Description of Preferred Embodiments

Preferred embodiments of the invention relate to a modified thermal spray approach which is made possible through the use of coating materials that are erosion resistant, and can be sprayed to high thickness (>100 mils) without spalling (see U.S. Pat. No. 7,256,369, the disclosure of which is incorporated by reference herein, for a material). Thick nickel-based coatings are not currently sprayed, with traditional high wear nickel based coatings being sprayed to a max of 30 mils. For the invention, a thick coating section is sprayed across the tubes which typically extends from the refractory top, up at least 2 inches at full thickness (the thick section will be referred to as a "wear pad"), then tapering down over an extended area above the wear pad to a zero thickness higher up (known as a taper zone). The "wear pad" acts as a very thick sacrificial coating band, which is expected to wear down locally in the thumbprint locations (in a similar way that the tube wears) during the running of the boiler. The depths of the thumbprints vary, depending on the severity of the wear process. The resulting wear pattern in the coating producing a wear pattern resembles an "eyebrow" on each tube (the "thumbprints" resembling•eye sockets). Once the thumbprints have worn approximately 100 mils into the wear pad, this pattern of eyebrows and thumbprints reduces further erosion because the pattern alters the erosion process and significantly slows it. While eyebrows may be directly sprayed onto boiler tubes initially (as part of this invention), i.e., no wear pad, it has been determined that it is simpler to spray a thick wear pad, and then to allow the pattern to develop during normal running of the boiler. To form the eyebrows, if desired, the lower end of the tubes is masked, say, using a steel bar, to a height just above where the thumbprints are formed, and a buildup of cladding laid down in the area, thickest just above the top of the mask. The mask is then removed, and a broad band of coating applied, providing the masked area with some cladding protection against the reduced, but still present, wear.

Once the eyebrow geometry has formed, future annual spray work maintains the geometry, (slow wear requires maintenance of the geometry).

This invention has been made possible because of the ability to spray very thick coatings, and the discovery that the formation of "eyebrows" limits wear which would result in parent tube damage. The saving to clients is large if no parent tube damage occurs during outages.

This invention provides an area of thick cladding or buildup, referred to a wear pad; along with a transition section, typically a tapering cladding section above the wear pad, referred to a taper zone; the wear pad and trapper zone being attached to the outer surface of a tube wall, division wall or wing wall of a circulating bed boiler; directly above the refractory wall. The wear pad is provided as a sacrificial wear pad, and as such, is intended to wear during the initial period of normal boiler operation; the wear pattern in a circulating bed boiler above the refractory producing a desired geometry resembling "thumb prints" or "eye sockets," with "eyebrows" above the sockets. As the eyebrow and sockets develop in the wear pad layer, the wear mechanism significantly slows, slowing sufficiently over time to prevent any wear of the underlying boiler tube. Thick cladding is considered greater than 60 mils; and may be upwardly adjusted to ensure that the wear mechanism is sufficiently snuffed out to prevent wear of the underlying parent tube. The taper region extends over distance of more than 12 inches, upwardly tapering in any geometry from the thickest cladding section to zero. The taper is required to prevent any form of discontinuity created by the presence of the wear pad.

The taper may extend to any height over the minimum of 12 inches, even extending the full wall height, to provide general wear protection of the tubes, and as such may comprise various constant thickness sections and multiple tapers.

The wear pad is intended to be refurbished from time to time by building up the wear pad and taper. The eyebrow geometry obtained during the initial application or as the result of erosion processes may be preserved, since this is a desirable geometry to reduce erosion severity.

Using masks, or skilled cladding applicators, the wear pad may be applied with the eyebrow geometry at the initial installation, removing the requirement for a "wear-in" period described above.

A wear pad may be incorporated into the original design of the tube by creating a thick section of tube which will act as a wear pad with a sacrificial area.

Considering the above, the thicker tube section may be provided for by using a tube with a reduced inner bore diameter, or using a thick wall tube section with a larger outside diameter, and a taper zone tube section that provides a gradual reduction in OD of the tube above the wear pad section.

A wear resistant coating may be applied to extend overall tube life and provides a means of refurbishment for general long term wear.

A corrosion, erosion and abrasion resistant coating that is produced using a wire arc based spray technique; the alloy constituents being sourced specifically from a cored wire containing all the alloy constituents that comprise the final coating deposit; the average bulk composition of the coating alloy containing 39 to 66% Nickel, between 29% and 51% Cr, and 2-8% B, in an amount effective for precipitating borides of Cr, and Ni. Further Si additions between 0.5% and 6%, 0.5-10% Mo, and 0.5-6% Nb, 0.5-5% Al, 0.5-4% Ti, Fe 0.5-9% may be added, C 0.5%-4%, either singularly or in combination. Other minor alloying <<10%) can be considered if they do not affect the performance expected from the alloy; the final coating deposit comprising discernable layers of slightly segregated alloy compositions, so as to produce a nonhomogeneous coating composition, these layers being essential to the performance of the alloy as the layers act to arrest direct through-cracking and spalling as micro cracks will have a tendency to arrest at softer layers; the discrete layers hardness varying from 30 RC to 72 RC; the layered effect being achieved by specifically placing the Boron and Chrome constituents into the core of the wire so that during arc based spraying segregation or incomplete alloying can be guaranteed in the final deposit.

The coatings according to the present invention are specifically designed for articles subjected to wear and/or corrosion. Such articles include, for example, boiler tubes, hydraulic piston rods, pump casings, rollers in the paper and steel industry, wear plates, journals and shafts, and turbine blades and casings.

In one application, the coatings are designed to protect boiler tubes against erosion corrosion related wastage and are applied to the boiler tubes by means of a conventional arc spraying apparatus. However, it will be appreciated from the description below that the coatings could also be applied to the boiler tubes by other thermal spraying apparatus employing wires as the feed material and arc melting processes. Arc spraying methods and apparatus are well documented in the art, see for example, U.S. Pat. No. 6,156,443 (Dallaire, et al.); U.S. Pat. No. 5,837,326 (Dallaire, et al.); European Patent No. EP 0 522 438 (Zurecki et al.); and PCT Patent No. WO 98/00574 (Seitz), the disclosures of which are incorporated by reference.

The coatings of the present invention are formed from composite wires, which are fed through a conventional arc spraying apparatus, such as the apparatus disclosed in PCT Patent No. WO 01/08810 (Seitz), the disclosure of which is incorporated herein by reference.

The cored wires may be formed in a conventional manner by placing the mix, which need not be an agglomerated mix, onto an alloy 625 strip, or a strip of some other outer sheath alloy, which is drawn continuously through a plurality of wire drawing dies to form an outer wire sheath around an inner powdered core. The final outer diameter of the cored wire will depend upon the application for which it is used. For most applications, the cored wire final diameter ranges between about 0.8 mm to about 6.4 mm. Conventional cored wire manufacturing techniques are disclosed in U.S. Pat. No. 6,156,443 (Dallaire et al.) and U.S. Pat. No. 6,513,728 (Hughes et al.), of which both disclosures are hereby incorporated by reference.

Description of Wire Containing Chrome Carbide (CC) and Boron Carbide (BC) According to one Embodiment The composite wires of the BC/CC embodiment of the present invention comprise an outer sheath formed from a metal or alloy. In this embodiment of the invention, which is particularly suited for the high temperature erosion-corrosion environment found in boiler applications, the cored wires comprise an outer tubular sheath formed from a chromium bearing, nickel base alloy such as an alloy 625, and an inner core, which comprises boron carbide and chrome carbide.

The preferred inner core formulation preferably comprises chrome carbide in an amount between about 25% and about 400% by weight of the amount of boron carbide. In other words, the ratio of chrome carbide to boron carbide preferably ranges between about 1:4 to about 4:1. More preferably, the inner core comprises chrome carbide in an amount between about 67% and about 230% by weight of the amount of boron carbide. In other words, the ratio of chrome carbide to boron carbide preferably ranges between about 1:1.5 to about 2.3:1. In one preferred embodiment, the inner core comprises about 100% by weight of chrome carbide relative to the amount of boron carbide, in other words the amounts of chrome carbide and boron carbide are substantially equivalent.

The chrome carbide in the inner core increases the wear resistance of the deposited coating or weld overlay. The chrome carbide is retained during the thermal spraying or welding, and is present in molten form within the coating structure during application. However, this benefit accrues on a sliding scale—the more chrome carbide used the better the result, but at the expense of displacing boron carbide and its beneficial effects. Conversely, most of the boron carbide does not appear to survive as a carbide during application of the coating. The boron carbide breaks up in the arc as uncontaminated boron and carbon, which both have substantial hardening effects. The hardening effect increases the hardness of the metal of the outer sheath through alloying and/or diffusion processes. Some of the larger particles of boron carbide may survive the arc. Those particles add to the wear resistance, much like the chrome carbide, but the resistance achieved with large particles of boron carbide is not as effective as that achieved with chrome carbide. Furthermore, the boron carbide inhibits the formation of oxides in the molten outer sheath during spraying. To achieve this result, a sufficient amount of boron carbide should be present in the inner core. Preferably, at least about 35% by weight of the inner core should consist of boron carbide to achieve very low oxide formation. However, this benefit' accrues on a sliding scale—the more boron carbide used the better the result, but at the expense of displacing chrome carbide and its beneficial effects.

In addition to preventing oxide formation, the boron carbide also lowers the melting temperature of the binder material (except for aluminum, which already has a low melting point) and improves the solidification properties of the metal matrix making up the deposited coating. This gives fusing and self-fluxing properties to the coating.

Furthermore, there is an increase in the temperature range of the solid-liquid phase (i.e., during melting or freezing). The increased range improves the spray characteristics and also improves the fusing characteristics.

In addition to the qualities described above, the coatings of the BC/CC embodiment of present invention are also easier to install and maintain. The boron additions in the metal binder matrix and the chrome carbide hard-phase morphology make repairs to the coatings relatively easy. Added to this, the high bond strength and the low coating residual stresses allow existing coatings to be grit blasted without disbonding the surrounding material.

While the inner core formulation of the BC/CC embodiment of the present invention centers around chrome carbide and boron carbide, the inner core may also contain additional materials. The additional materials may include: carbides, such as tungsten carbide, titanium carbide, vanadium carbide, and the like; oxides, such as aluminum oxide, chrome oxide, zirconium oxide, and the like; and borides, such as chrome boride, nickel boride, iron boride, and the like. The inner core may also include additional metal powders, such as aluminum, nickel, chrome, or alloy powder, or composite powders, such as tungsten carbide nickel and chrome carbide nickel chrome powders.

The grain size of the chromium carbide and boron carbide will have an effect on the physical properties of the applied coating. Generally, the finer the grains of the carbides, the more homogenous the coating will be and generally the better the wear and corrosion properties. However, the cost and manufacturing constraints will limit the lower end of the grain size range. U.S. Pat. No. 4,741,974 (Longo, et al.), the disclosure of which is hereby incorporated by reference, discloses the effect of grain size with respect to boron carbide.

EXAMPLES

Example 1

A composite wire of the BC/CC embodiment of the present invention was formed with an outer sheath comprising of INCONEL (R) alloy 625 and an inner core comprising a substantially equivalent mixture of chrome carbide and boron carbide. INCONEL (R) alloy 625 is a product of the Special Metals Corporation and contains 0.1% C, 0.5% Mn, 5.0% Fe, 0.02% P, 0.015% S, 0.5% Si, 0.5% Cu, 58% min Ni, 0.4% Al, 0.4% Ti, 20.0%-23.0% Cr, 3.15%-4.15% Nb+Ta, 8.0%10.0% Mo. This composite wire provided coatings with good toughness characteristics, low oxides, and good wear characteristics due to the novel carbide formulation of the inner core. In addition, there was an increase in the hardness of the metal binder due to the boron content. The coatings also exhibited good bonding characteristics. The following table illustrates the improved wear resistance of a coatings deposited by a composite wire of the present BC/CC embodiment of the invention (row 3 and row 4) compared to the wear resistance of other coatings:

| ASTM G65 Wear Test (15 minutes): | Weight Loss (grams lost/6000 wheel revolutions) |
|---|---|
| Coating | |
| 1) Fe Cr B (Arc) | 0.429 |
| 2) Fe Cr Mo W Mn B (HVOF) | 0.319 |
| 3) CrC/BC-Alloy 625 (Arc) | 0.285 |
| 4) CrC/BC-Fe Cr (Arc) | 0.212 |
| After Fusing | |
| 3) CrC/BC-Alloy 625 (Arc) | 0.184 |
| 4) CrC/BC-Fe Cr (Arc) | 0.165 |

Note that coatings of the BC/CC embodiment of the present invention, as discussed above, have low oxide content and thus have superior fusing characteristics. The wear resistances of the CrC/BC—Alloy 625 coating and the CrC/BC—Fe Cr coating were substantially improved upon fusing.

In addition to the improvement to wear resistance, the overall strength of the metal binder was also substantially increased. The coating deposited with the CrC/BC-Alloy 625 composite wire exhibited an average hardness measurement of 803.2 100 g/Vickers/10 seconds. Whereas, coatings of pure alloy 625 are typically on the order of 280-350 100 g/Vickers/10 seconds.

Example 2

To illustrate bond strength, clean, bright smooth stainless steel coupons were coated, without any surface roughness, to establish how thick a coating could be sprayed before spalling occurred (i.e., bond failure). The first coupon was arc sprayed with pure alloy 625 and the second coupon was sprayed with a composite wire comprising an alloy 625 outer sheath and an inner core comprising 40% by weight boron carbide and 60% by weight chromium carbide. The first coupon exhibited delamination at 300 .mu.m, whereas the coating applied in accordance with the BC/CC embodiment of the present invention was sprayed up to 2000 .mu.m without any appearance of spalling.

Example 3

Two clean steel coupons were coated, with grit-blasted surfaces; the first with pure alloy 625 and the second with a composite wire comprising an alloy 625 outer sheath and an inner core comprising 40% by weight boron carbide and 60% by weight chromium carbide. The coupons were mechanically damaged by cracking off the coating with a hammer and chisel. The pure 625 coating was peeled off of the first coupon as a continuous layer, while the composite wire sprayed coating could not be disjoined from the coupon. Rather, the composite wire sprayed coupon only sustained damage to the impact site, thus illustrating the high bond strength.

As stated above, in addition to good toughness, wear resistance, increased metal binder hardness, and improved bonding of the coating to the substrate, the inner core formulation of the BC/CC embodiment of the present invention also inhibits oxide formation.

While alloy 625 is a preferred alloy for the outer sheath in certain high temperature erosion-corrosion applications of the BC/CC embodiment of the invention, alternative metals and alloys can also be employed. For example, alternative chrome bearing nickel base alloys include alloy C-276, alloy 686, or alloy 690. INCONEL (R) C-276, alloy 686, and alloy 690, which are all produced by the Special Metals Corporation contains: 0.02% C, 1.0% Mn, 4.0%-7.0% Fe, 0.04% P, 0.03% S, 0.08% Si, 0.5% Cu, bal. Ni, 2.5% Co, 14.5%-16.5% Cr, 15.0%-17.0% Mo, 3.0%-4.5% W (INCONEL (R) C-276); 0.01% C, 1.0% Mn, 5.0% Fe, 0.02% P, 0.02% S, 0.08% Si, 0.5% Cu, bal. Ni, 0.5% Al, 0.25% Ti, 19.0%23.0% Cr, 15.0%-17.0% Mo, 3.0%-4.4% W. (INCONEL (R) alloy 686); and 0.02% C, 1.0% Mn, 7.0%-11.0% Fe, 0.015% S, 0.5% Si, 0.5% Cu, bal. Ni, 27%-31% Cr (INCONEL (R) alloy 690). Nickel copper alloys, such as alloy 400, alloy R-405, and the like, and nickel molybdenum alloys such as, alloy B, alloy B-2, and the like, may also be employed depending on the required physical properties of the resulting coating and the environment to which the coating will be exposed.

As stated above, the metal binder material for the CC/SC embodiment is not limited to nickel base alloys, rather the outer sheath may be constructed of any metal or alloy. Additional suitable binder material includes, but is not limited to, iron, carbon and low alloy steels, stainless steels, nickel, copper, copper alloys (e.g., brasses, bronzes, and aluminum bronzes), aluminum, aluminum alloys (e.g., aluminum-copper, aluminum-manganese, aluminum-manganese-magnesium, aluminum-silicon, aluminum-manganese-magnesium-chrome, aluminum-magnesium-silicon, and aluminum-zinc-manganese-magnesium-copper), titanium, titanium alloys (e.g., titanium alloyed with palladium, molybdenum, nickel, aluminum, vanadium, niobium, tantalum, tin, zirconium, chromium and iron), cobalt, cobalt alloys (e.g., cobalt alloyed with chromium, nickel, molybdenum, and tungsten), zirconium, zirconium alloys, tantalum and tantalum alloys. The combination of any of these binders with the inner core powder of the present invention results in coatings having superior physical properties over conventional coatings.

While certain preferred embodiments of the invention have been described herein, the invention is not to be construed as being so limited, except to the extent that such limitations are found in the claims.

What is claimed is:

1. A method to reduce the wear of a refractory wall of a boiler, the refractory wall having a plurality of parallel tubes vertically disposed therein and interconnected by a webbing, each of the tubes extending upwardly from a refractory ledge of the refractory wall and defining a fire side in front of the webbing and a cold side behind the webbing, each tube having a cylindrical portion with a generally cylindrical outer shape; said method comprising:

thermal spraying a first coating onto a portion of the cylindrical portion of the plurality of tubes extending upward from the refractory ledge and the webbing therebetween at the fire side to thereby increase the thickness of the plurality of tubes and the webbing therebetween at the fire side, the first coating extending upwardly from the refractory ledge, wherein the first coating on the tubes has a thickness of at least 0.060 inches at a transition between the plurality of tubes and the refractory ledge, the thickness of a section of the first coating tapering upwardly to nil, wherein the first coating extents over a distance of at least 12 inches on the cylindrical portion of the plurality of tubes and webbing therebetween extending vertically upward from the refractory ledge; and wherein a thickness of the first coating and a thickness of the fire side sidewall of the plurality of tubes, combined, defines a total material thickness at the fire side that is greater than a total material thickness of a cold side sidewall of the plurality of tubes at the cold side;

wherein the fire side sidewall of the plurality of tubes is opposite the cold side sidewall of the plurality of tubes; wherein each of the plurality of tubes has a continuously uniform outside diameter extending from a point below the refractory ledge to an uppermost point at which the first coating is applied above the refractory ledge.

2. The method of claim 1, wherein the section of the first coating tapered upwardly is tapered linearly.

3. The method of claim 1, wherein the section of the first coating tapered upwardly is tapered from the refractory ledge.

4. The method of claim 2, wherein the section of the first coating tapered upwardly is tapered linearly.

5. The method of claim 1, wherein only one side of the plurality of tubes and webbing therebetween are coated.

6. The method of claim 5, wherein a side of the plurality of tubes and webbing therebetween exposed to the heated portion of the boiler are coated.

7. The method of claim 1, wherein the transition between the plurality of tubes and the refractory ledge is approximately 0-5 inches.

8. The method of claim 1, further comprising:

thermal spraying a second coating onto the portion of the cylindrical portion of the plurality of tubes extending upward from the refractory ledge and the webbing therebetween and the first coating, the second coating extending upwardly from the refractory ledge, wherein the thickness of a section of the coating tapers upwardly to nil, and wherein the second coating extents over a distance of at least 12 inches on the cylindrical portion of the plurality of tubes and webbing therebetween extending vertically upward from the refractory ledge.

9. The method of claim 1, wherein the thermal spray of the first coating includes:

providing a cored wire containing a chrome constituent and a boron constituent in the core of the wire, said wire further comprising a nickel or nickel alloy outer sheath, melting the wire by an arc-based thermal spray technique to form a molten alloy coating composition, and applying the molten alloy coating composition onto a substrate and permitting it to solidify to form an alloy coating deposit, wherein the alloy coating deposit comprises at least 10 discrete discernible layers per 0:06 inch of coating of segregated incomplete alloy compositions, wherein the alloy coating deposit comprises, in bulk on a weight basis, 39 to 66% nickel or nickel alloy, 29% to 51% Cr, and 2 to 8% B, the discrete layers having varying hardness and being in the range of from 30 RC to 72 RC, and wherein the cored wire contains all the alloy constituents that comprise the final coating deposit.

10. The method of claim 1, wherein the boiler is a fluidized bed.

11. The method of claim 1, wherein the plurality of tubes are formed from steel and the first coating is applied by providing a wire having a metallic outer sheath and a powdered inner core, wherein the inner core comprises at least about 28% by weight of boron sourced from pure boron or a compound of boron and chrome sourced from pure chrome or a compound of chrome in an amount between about 67% and about 185% by weight of the amount of the boron; the thermal spraying of the first coating further includes:
- melting the wire using an electric arc heat source to form a melt;
- atomizing and spraying the melt onto the tubes by compressed gas;
- wherein the composite wire is selected to form a coating on the substrate comprising the metal of the sheath, chrome, and boron, and
- permitting the coating to solidify.

\* \* \* \* \*